US012506263B2

(12) United States Patent
Kuo et al.

(10) Patent No.: US 12,506,263 B2
(45) Date of Patent: Dec. 23, 2025

(54) ANTENNA STRUCTURE

(71) Applicant: Wistron NeWeb Corp., Hsinchu (TW)

(72) Inventors: Li-Kai Kuo, Hsinchu (TW); Cheng-Wei Chiang, Hsinchu (TW); Wen-Pin Ho, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 100 days.

(21) Appl. No.: 18/405,206

(22) Filed: Jan. 5, 2024

(65) Prior Publication Data

US 2024/0266735 A1 Aug. 8, 2024

(30) Foreign Application Priority Data

Feb. 8, 2023 (TW) ................................ 112104352

(51) Int. Cl.
*H01Q 5/40* (2015.01)
*H01Q 1/38* (2006.01)

(52) U.S. Cl.
CPC ................ *H01Q 5/40* (2015.01); *H01Q 1/38* (2013.01)

(58) Field of Classification Search
CPC ........... H01Q 5/40; H01Q 1/38; H01Q 1/243; H01Q 5/378; H01Q 9/42
See application file for complete search history.

(56) References Cited

U.S. PATENT DOCUMENTS

2013/0135162 A1* 5/2013 Shamblin ................ H01Q 9/06 343/745
2015/0022422 A1 1/2015 Chang
2015/0200447 A1 7/2015 Tang
2021/0066801 A1* 3/2021 Tsai ........................ H01Q 9/42

FOREIGN PATENT DOCUMENTS

TW 201505254 A 2/2015
TW 201817083 A 5/2018

* cited by examiner

*Primary Examiner* — David E Lotter
(74) *Attorney, Agent, or Firm* — McClure, Qualey & Rodack, LLP

(57) ABSTRACT

An antenna structure includes a first radiation element, a second radiation element, a third radiation element, a first floating metal element, a second floating metal element, a tuning circuit, and a nonconductive support element. The first radiation element has a feeding point. The second radiation element is coupled to the feeding point. The third radiation element is coupled through the tuning circuit to a ground voltage. The first floating metal element is disposed between the second radiation element and the third radiation element. The second floating metal element is disposed between the first radiation element and the third radiation element. The first radiation element, the second radiation element, the third radiation element, and the tuning circuit are disposed on the nonconductive support element.

20 Claims, 6 Drawing Sheets

ANTENNA STRUCTURE

CROSS REFERENCE TO RELATED APPLICATIONS

This application claims priority of Taiwan Patent Application 112104352 filed on Feb. 8, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to an antenna structure that includes a first radiation element, a second radiation element, a third radiation element, a first floating metal element, a second floating metal element, a tuning circuit, and a nonconductive support element. The first radiation element has a feeding point. The second radiation element is coupled to the feeding point. The third radiation element is coupled through the tuning circuit to a ground voltage. The first floating metal element is disposed between the second radiation element and the third radiation element. The second floating metal element is disposed between the first radiation element and the third radiation element. The first radiation element, the second radiation element, the third radiation element, and the tuning circuit are disposed on the nonconductive support element.

In another exemplary embodiment, the invention is directed to an antenna structure that includes a first radiation element, a second radiation element, a third radiation element, a fourth radiation element, a fifth radiation element, a first floating metal element, a second floating metal element, a tuning circuit, and a nonconductive support element. The first radiation element has a feeding point. The first radiation element is coupled through the second radiation element to a ground voltage. The third radiation element is coupled to the first radiation element. The fourth radiation element is coupled to the first radiation element. The third radiation element and the fourth radiation element substantially extend in opposite directions. The fifth radiation element is coupled through the tuning circuit to the ground voltage. The first floating metal element is disposed between the second radiation element and the third radiation element. The second floating metal element is disposed between the third radiation element and the fifth radiation element. The first radiation element, the second radiation element, the third radiation element, the fourth radiation element, the fifth radiation element, and the tuning circuit are disposed on the nonconductive support element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
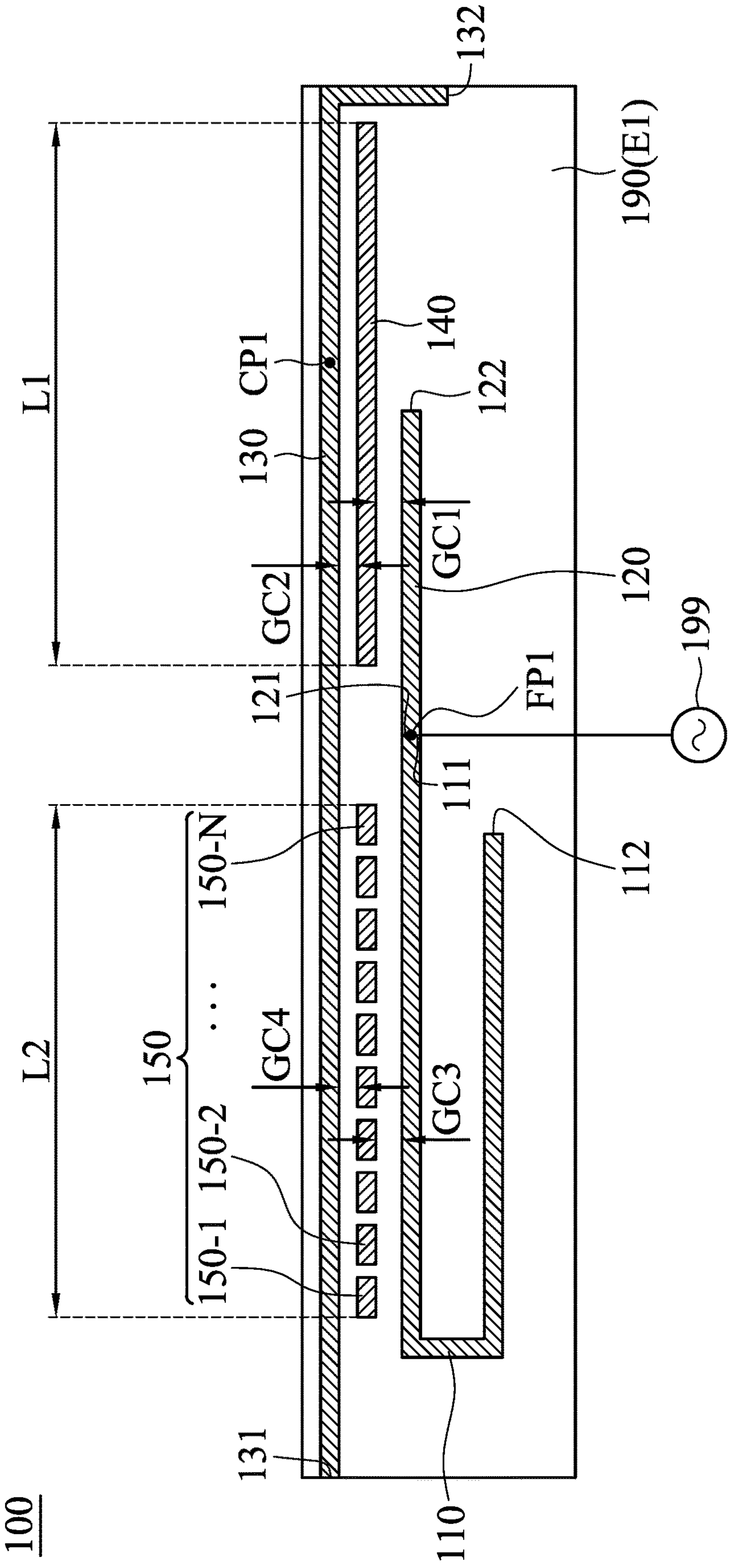
FIG. 1 is a top view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
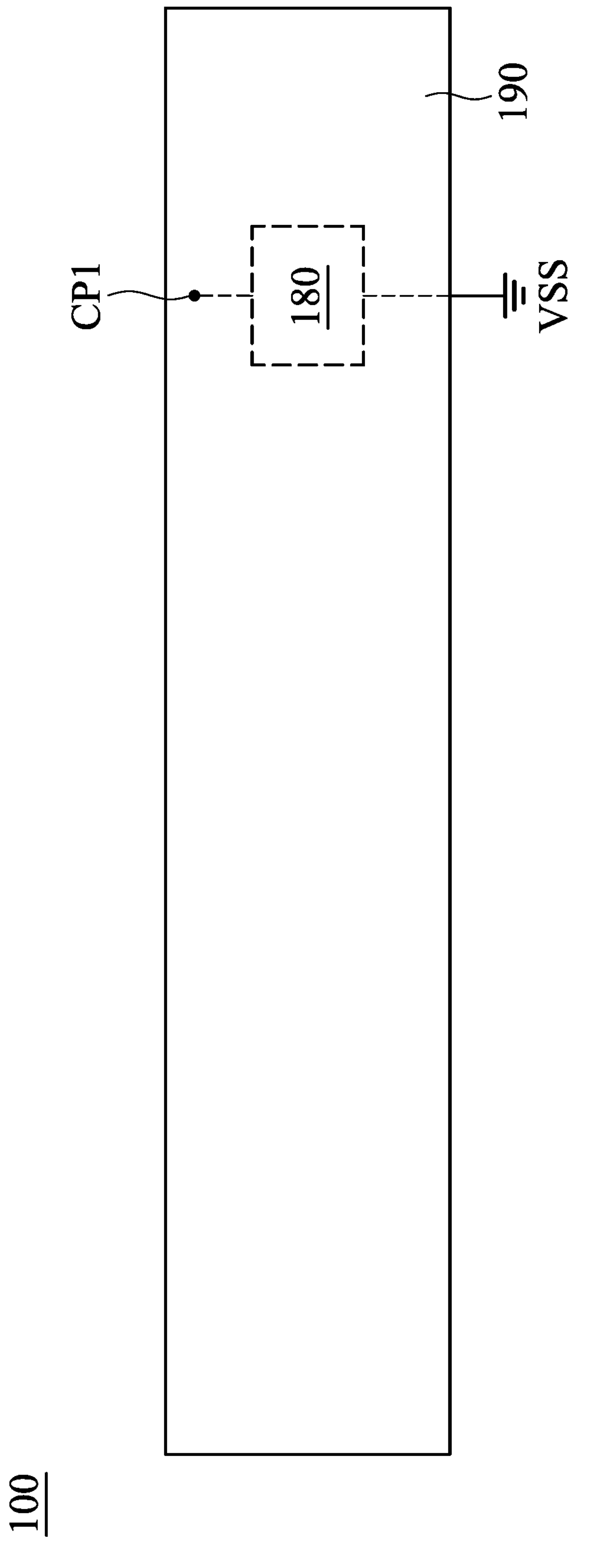
FIG. 2 is a see-through view of an antenna structure according to an embodiment of the invention.
Figure 3:
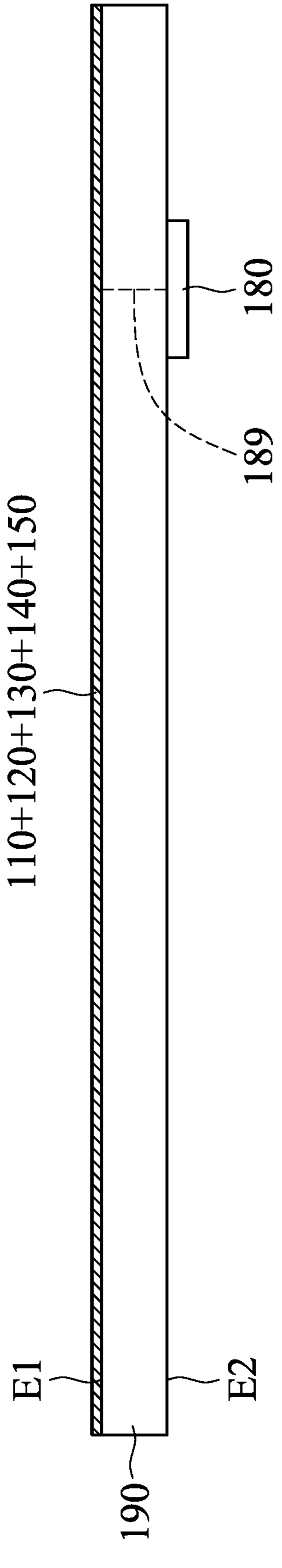
FIG. 3 is a side view of an antenna structure according to an embodiment of the invention.

FIG. 1 is a top view of an antenna structure 100 according to an embodiment of the invention. FIG. 2 is a see-through view of the antenna structure 100 according to an embodiment of the invention. FIG. 3 is a side view of the antenna structure 100 according to an embodiment of the invention. Please refer to FIG. 1, FIG. 2 and FIG. 3 together. The antenna structure 100 may be applied to a mobile device, such as a smart phone, a tablet computer, or a notebook computer. In the embodiment of FIG. 1, FIG. 2 and FIG. 3, the antenna structure 100 includes a first radiation element 110, a second radiation element 120, a third radiation element 130, a first floating metal element 140, a second floating metal element 150, a tuning circuit 180, and a nonconductive support element 190. The first radiation element 110, the second radiation element 120, and the third radiation element 130 may all be made of metal materials, such as copper, silver, aluminum, iron, or their alloys.

The nonconductive support element 190 may be made of a plastic material. The nonconductive support element 190 has a first surface E1 and a second surface E2 which are opposite to each other. The first radiation element 110, the second radiation element 120, and the third radiation element 130 are disposed on the first surface E1 of the nonconductive support element 190. The tuning circuit 180 is disposed on the second surface E2 of the nonconductive support element 190. In some embodiments, each radiation element and/or each metal element can be formed on the nonconductive support element 190 by using LDS (Laser Direct Structuring) technology.

The first radiation element 110 may substantially have a U-shape. Specifically, the first radiation element 110 has a first end 111 and a second end 112. A feeding point FP1 is positioned at the first end 111 of the first radiation element 110. The second end 112 of the first radiation element 110 is an open end, which may be adjacent to the feeding point FP1. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The second radiation element 120 may substantially have relatively short straight-line shape. Specifically, the second radiation element 120 has a first end 121 and a second end 122. The first end 121 of the second radiation element 120 is coupled to the feeding point FP1. The second end 122 of the second radiation element 120 is an open end. For example, the second end 112 of the first radiation element 110 and the second end 122 of the second radiation element 120 may substantially extend in the same direction.

The antenna structure 100 is excited by a signal source 199. For example, the signal source 199 may be an RF (Radio Frequency) module. In some embodiments, the feeding point FP1 is coupled to a positive electrode of the signal source 199, but it is not limited thereto.

The third radiation element 130 may substantially have a relatively long L-shape. Specifically, the third radiation element 130 has a first end 131 and a second end 132. Each of the first end 131 and the second end 132 of the third radiation element 130 is an open end. The third radiation element 130 is adjacent to both the first radiation element 110 and the second radiation element 120.

The first floating metal element 140 does not directly touch any other radiation element and/or any other metal element. The first floating metal element 140 may substantially have a relatively long straight-line shape. The first floating metal element 140 is disposed between the second radiation element 120 and the third radiation element 130. For example, a first coupling gap GC1 may be formed between the first floating metal element 140 and the second radiation element 120, and a second coupling gap GC2 may be formed between the first floating metal element 140 and the third radiation element 130. In some embodiments, the first floating metal element 140 is disposed on the first surface E1 of the nonconductive support element 190. However, the invention is not limited thereto. In other embodiments, the first floating metal element 140 may be disposed on the second surface E2 of the nonconductive support element 190. Alternatively, the first floating metal element 140 may be disposed on any adjacent plane, and a vertical projection of the first floating metal element 140 may be disposed between the second radiation element 120 and the third radiation element 130.

The second floating metal element 150 does not directly touch any other radiation element and/or any other metal element. The second floating metal element 150 includes a plurality of metal segments 150-1, 150-2, . . . , and 150-N, where "N" is any positive integer greater than or equal to 2. For example, if the second floating metal element 150 includes multiple metal segments, these metal segments may be separate from each other, and they may be substantially arranged in the same straight line. The second floating metal element 150 is disposed between the first radiation element 110 and the third radiation element 130. For example, a third coupling gap GC3 may be formed between the second floating metal element 150 and the first radiation element 110, and a fourth coupling gap GC4 may be formed between the second floating metal element 150 and the third radiation element 130. In some embodiments, the second floating metal element 150 is disposed on the first surface E1 of the nonconductive support element 190. However, the invention is not limited thereto. In other embodiments, the second floating metal element 150 may be disposed on the second surface E2 of the nonconductive support element 190. Alternatively, the second floating metal element 150 may be disposed on any adjacent plane, and a vertical projection of the second floating metal element 150 may be disposed between the first radiation element 110 and the third radiation element 130. In alternative embodiments, the second floating metal element 150 merely includes a single metal segment, whose length is adjustable according to practical requirements.

A connection point CP1 on the third radiation element 130 is coupled through the tuning circuit 180 to a ground voltage VSS. The ground voltage VSS may be provided by a system ground plane (not shown). For example, the connection point CP1 may be closer to the second end 132 of the third radiation element 130 than the first end 131 of the third radiation element 130, but it is not limited thereto. In some embodiments, the antenna structure 100 further includes a conductive via element 189 which penetrates the nonconductive support element 190, and the tuning circuit 180 is coupled through the conductive via element 189 to the third radiation element 130.

Figure 4:
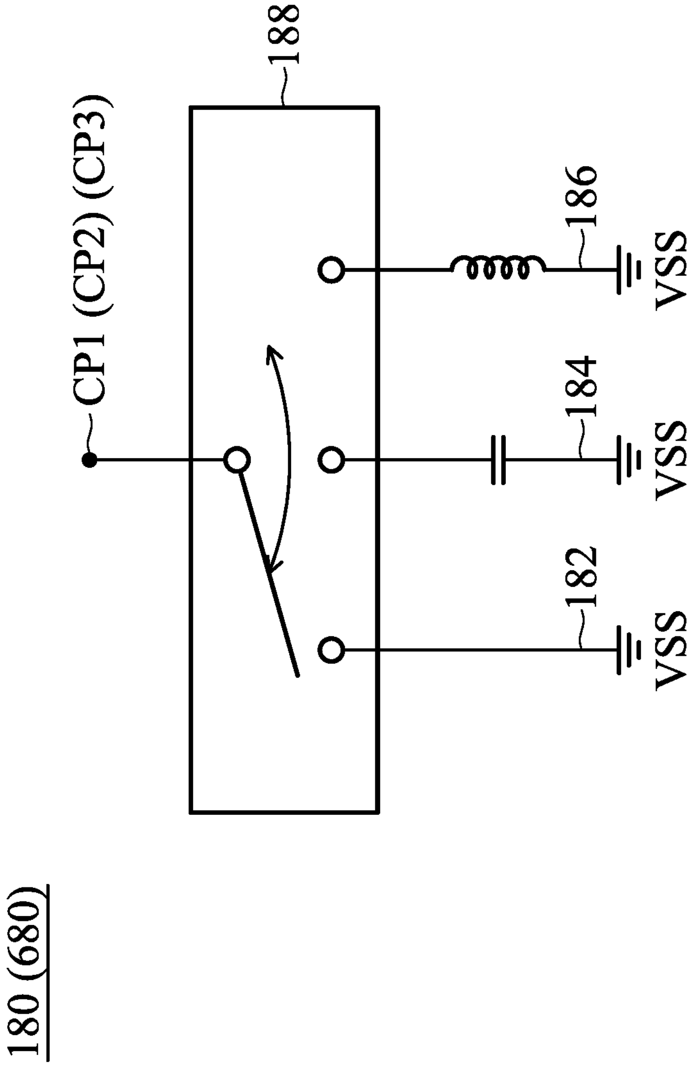
FIG. 4 is a diagram of a tuning circuit according to an embodiment of the invention.

FIG. 4 is a diagram of the tuning circuit 180 according to an embodiment of the invention. In the embodiment of FIG. 4, the tuning circuit 180 includes a short-circuited element 182, a capacitive element 184, an inductive element 186, and a switch element 188. The short-circuited element 182, the capacitive element 184, and the inductive element 186 are respectively coupled to the ground voltage VSS. In addition, a terminal of the switch element 188 is coupled to the connection point CP1 on the third radiation element 130, and another terminal of the switch element 188 is switchable between the short-circuited element 182, the capacitive element 184, and the inductive element 186. Thus, by using the switch element 188, the third radiation element 130 can be coupled through either the short-circuited element 182, the capacitive element 184, or the inductive element 186 to the ground voltage VSS. However, the invention is not limited thereto. In alternative embodiments, the internal design of the tuning circuit 180 is adjustable according to different requirements.

According to practical measurements, the antenna structure 100 can cover a first frequency band, a second frequency band, a third frequency band, and a fourth frequency band. For example, the first frequency band may be from 617 MHz to 824 MHz, the second frequency band may be from 824 MHz to 960 MHz, the third frequency band may be from 1452 MHz to 1610 MHz, and the fourth frequency band may be from 1700 MHz to 2690 MHz. Therefore, the antenna structure 100 can support at least the wideband operations of LTE (Long Term Evolution) and GPS (Global Positioning System).

In some embodiments, the operational principles of the antenna structure 100 will be described as follows. The third radiation element 130 can be excited by the first radiation element 110 and the second radiation element 120 using a coupling mechanism, so as to generate the first frequency band. The first radiation element 110 can be independently excited, so as to generate the second frequency band. The first floating metal element 140 can be excited by the second radiation element 120 using a coupling mechanism, so as to generate the third frequency band. The first radiation element 110 and the second radiation element 120 can be excited together, so as to generate the fourth frequency band. The second floating metal element 150 is configured to disturb the current distribution between the first radiation element 110 and the third radiation element 130, thereby fine-tuning the impedance matching of the fourth frequency band. In addition, the tuning circuit 180 can use its itself switching operation to increase the operational bandwidths of the first frequency band, the second frequency band, the third frequency band, and the fourth frequency band.

In some embodiments, the element sizes of the antenna structure 100 will be described as follows. The length L1 of the first floating metal element 140 may be shorter than or equal to 0.5 wavelength ($\lambda/2$) of the third frequency band of the antenna structure 100. The length L2 of the second floating metal element 150 may be shorter than or equal to 0.5 wavelength ($\lambda/2$) of the fourth frequency band of the antenna structure 100. The width of the first coupling gap GC1 may be shorter than or equal to 2.5 mm. The width of the second coupling gap GC2 may be shorter than or equal to 2.5 mm. The width of the third coupling gap GC3 may be shorter than or equal to 2.5 mm. The width of the fourth coupling gap GC4 may be shorter than or equal to 2.5 mm. The above ranges of element sizes are calculated and obtained according to many experimental results, and they help to optimize the operational bandwidth and impedance matching of the antenna structure 100.

Figure 5:
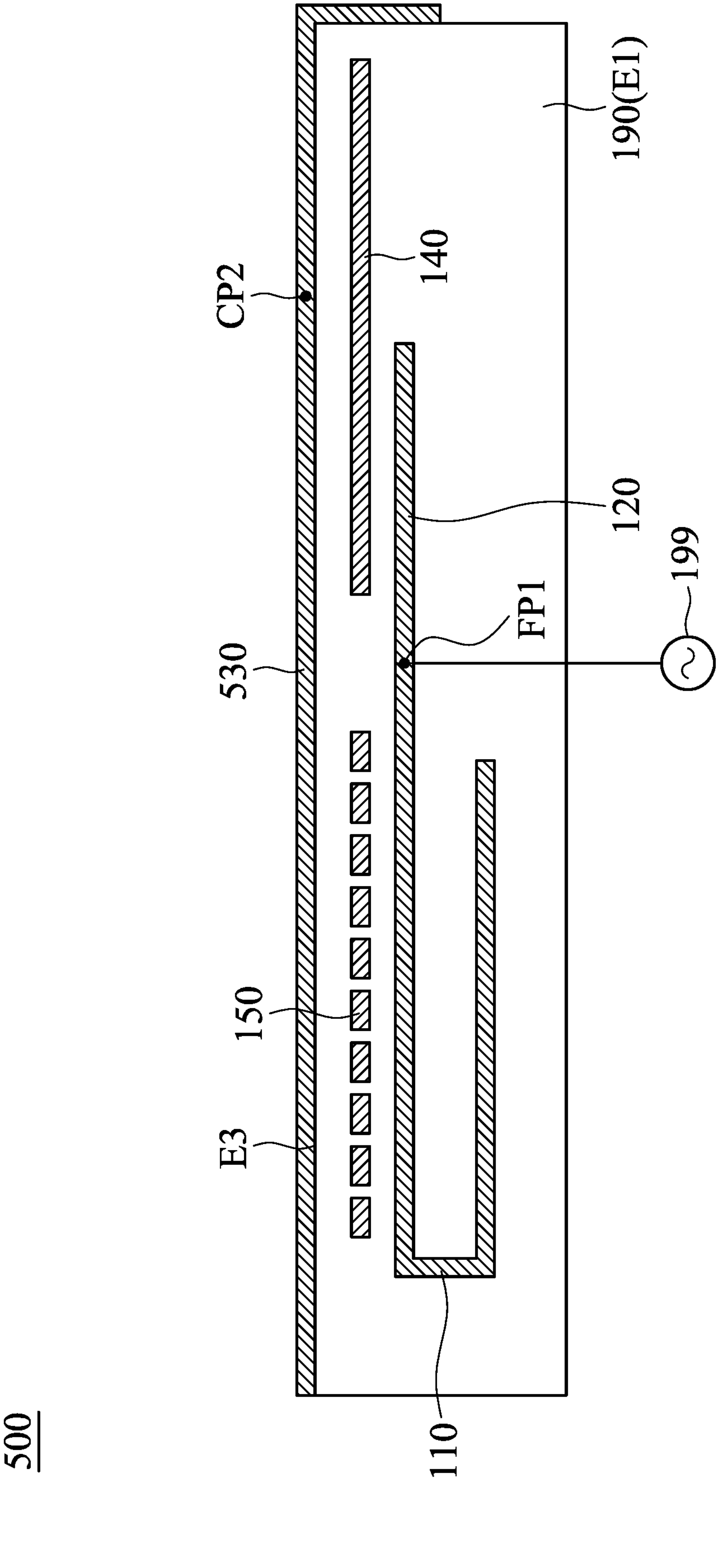
FIG. 5 is a top view of an antenna structure according to an embodiment of the invention.

FIG. 5 is a top view of an antenna structure 500 according to an embodiment of the invention. FIG. 5 is similar to FIG. 1, FIG. 2 and FIG. 3. In the embodiment of FIG. 5, the nonconductive support element 190 further has a side surface E3, and a third radiation element 530 of the antenna structure 500 is disposed on the side surface E3 of the nonconductive support element 190. In addition, a connection point CP2 on the third radiation element 530 is also coupled through the aforementioned tuning circuit 180 to the ground voltage VSS. With such a design, the overall size of the antenna structure 500 can be further reduced since the third radiation element 530 does not occupy the design area of the first surface E1 of the nonconductive support element 190. Other features of the antenna structure 500 of FIG. 5 are similar to those of the antenna structure 100 of FIG. 1, FIG. 2 and FIG. 3. Therefore, the two embodiments can achieve similar levels of performance.

Figure 6:
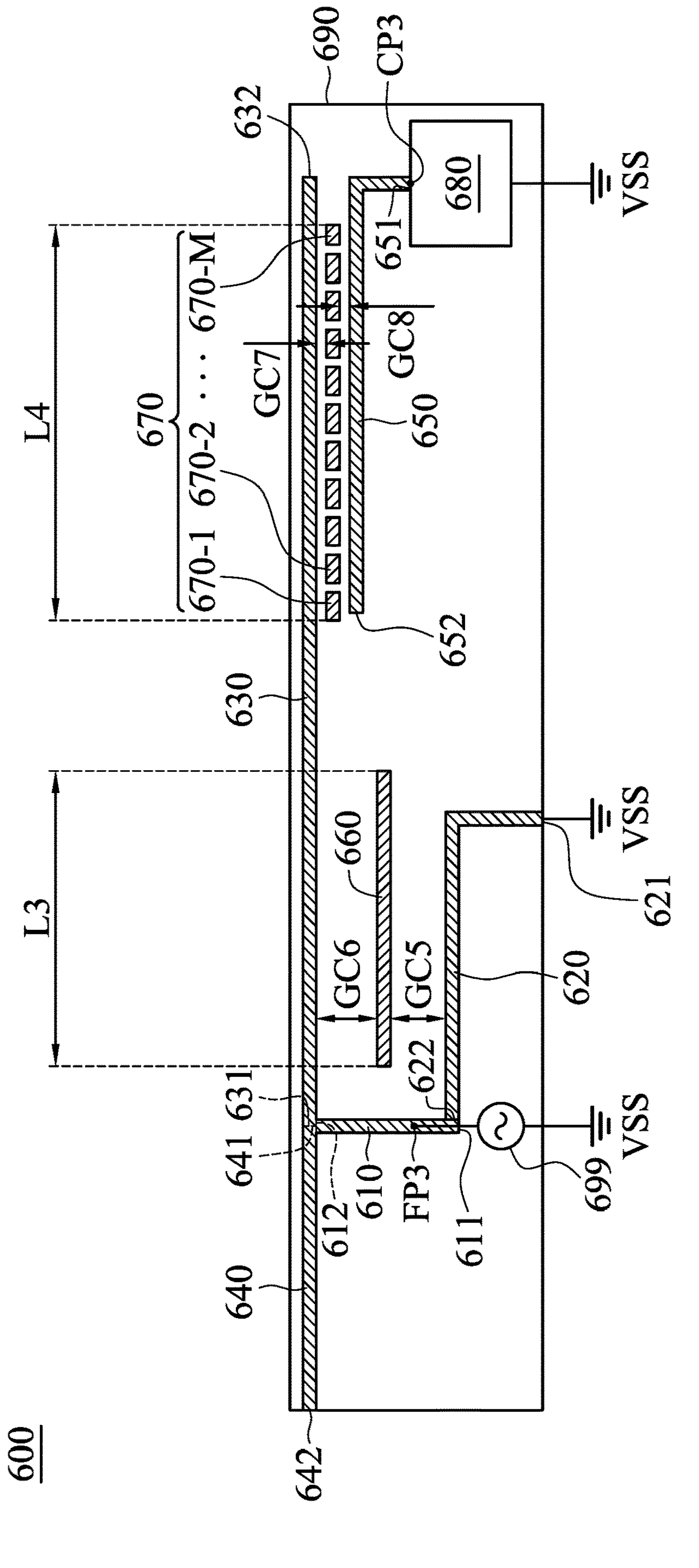
FIG. 6 is a top view of an antenna structure according to an embodiment of the invention.

FIG. 6 is a top view of an antenna structure 600 according to an embodiment of the invention. In the embodiment of FIG. 6, the antenna structure 600 includes a first radiation element 610, a second radiation element 620, a third radiation element 630, a fourth radiation element 640, a fifth radiation element 650, a first floating metal element 660, a second floating metal element 670, a tuning circuit 680, and a nonconductive support element 690. The first radiation element 610, the second radiation element 620, the third radiation element 630, the fourth radiation element 640, and the fifth radiation element 650 may all be made of metal materials.

The nonconductive support element 690 may be made of a plastic material. The first radiation element 610, the second radiation element 620, the third radiation element 630, the fourth radiation element 640, the fifth radiation element 650, the first floating metal element 660, the second floating metal element 670, and the tuning circuit 680 may all be disposed on the same surface of the nonconductive support element 690.

The first radiation element 610 may substantially have a relatively short straight-line shape. Specifically, the first radiation element 610 has a first end 611 and a second end 612. A feeding point FP3 is adjacent to the first end 611 of the first radiation element 610.

The second radiation element 620 may substantially have an L-shape. Specifically, the second radiation element 620 has a first end 621 and a second end 622. The first end 621 of the second radiation element 620 is coupled to the ground voltage VSS. The second end 622 of the second radiation element 620 is coupled to the first end 611 of the first radiation element 610. In other words, the first radiation element 610 is coupled through the second radiation element 620 to the ground voltage VSS.

In some embodiments, the feeding point FP3 is coupled to a positive electrode of a signal source 699, and the ground voltage VSS is coupled to a negative electrode of the signal source 699. In alternative embodiments, the feeding point FP3 is coupled to the negative electrode of the signal source 699, and the ground voltage VSS is coupled to the positive electrode of the signal source 699.

The third radiation element 630 may substantially have a relatively long straight-line shape, which may be substantially perpendicular to the first radiation element 610. Specifically, the third radiation element 630 has a first end 631 and a second end 632. The first end 631 of the third radiation element 630 is coupled to the second end 612 of the first radiation element 610. The second end 632 of the third radiation element 630 is an open end.

The fourth radiation element 640 may substantially have a relatively median straight-line shape, which may be substantially perpendicular to the first radiation element 610. Specifically, the fourth radiation element 640 has a first end 641 and a second end 642. The first end 641 of the fourth radiation element 640 is coupled to the second end 612 of the first radiation element 610. The second end 642 of the fourth radiation element 640 is an open end. For example, the second end 632 of the third radiation element 630 and the second end 642 of the fourth radiation element 640 may substantially extend in opposite directions and away from each other. In some embodiments, the combination of the first radiation element 610, the third radiation element 630, and the fourth radiation element 640 substantially has a T-shape.

The fifth radiation element 650 may substantially has another L-shape, which may be adjacent to and separate from the third radiation element 630. Specifically, the fifth radiation element 650 has a first end 651 and a second end 652. A connection point CP3 is positioned at the first end 651 of the fifth radiation element 650. The second end 652 of the fifth radiation element 650 is an open end. For example, the second end 642 of the fourth radiation element 640 and the second end 652 of the fifth radiation element 650 may substantially extend in the same direction. The connection point CP3 on the fifth radiation element 650 is also coupled through the tuning circuit 680 to the ground voltage VSS. It should be understood that the internal design of the tuning circuit 680 has been described in the previous embodiment of FIG. 4, and will not be illustrated again herein.

The first floating metal element 660 does not directly touch any other radiation element and/or any other metal element. The first floating metal element 660 may substantially have a straight-line shape. The first floating metal element 660 is disposed between the second radiation element 620 and the third radiation element 630. For example, a first coupling gap GC5 may be formed between the first floating metal element 660 and the second radiation element 620, and a second coupling gap GC6 may be formed between the first floating metal element 660 and the third radiation element 630. In other embodiments, the first floating metal element 660 is disposed on any surface of the nonconductive support element 690. Alternatively, the first floating metal element 660 may be disposed on any adjacent plane, and a vertical projection of the first floating metal element 660 may be disposed between the second radiation element 620 and the third radiation element 630.

The second floating metal element 670 does not directly touch any other radiation element and/or any other metal element. The second floating metal element 670 includes a plurality of metal segments 670-1, 670-2, . . . , and 670-M, where "M" is any positive integer greater than or equal to 2. For example, if the second floating metal element 670 includes multiple metal segments, these metal segments may be separate from each other, and they may be substantially arranged in the same straight line. The second floating metal element 670 is disposed between the third radiation element 630 and the fifth radiation element 650. For example, a third coupling gap GC7 may be formed between the second floating metal element 670 and the third radiation element 630, and a fourth coupling gap GC8 may be formed between the second floating metal element 670 and the fifth radiation element 650. In other embodiments, the second floating metal element 670 is disposed on any surface of the nonconductive support element 690. Alternatively, the second floating metal element 670 may be disposed on any adjacent plane, and a vertical projection of the second floating metal element 670 may be disposed between the third radiation element 630 and the fifth radiation element 650. In alternative embodiments, the second floating metal element 670 merely includes a single metal segment, whose length is adjustable according to practical requirements.

According to practical measurements, the antenna structure 600 can cover a first frequency band, a second frequency band, a third frequency band, and a fourth frequency band. For example, the first frequency band may be from 617 MHz to 960 MHz, the second frequency band may be from 1400 MHz to 2000 MHz, the third frequency band may be from 2000 MHz to 2690 MHz, and the fourth frequency band may be from 3000 MHz to 6000 MHz. Therefore, the antenna structure 600 can support at least the wideband operations of LTE.

In some embodiments, the operational principles of the antenna structure 600 will be described as follows. The first radiation element 610 and the third radiation element 630 can be excited together to generate the first frequency band. The fifth radiation element 650 can be excited by the third radiation element 630 using a coupling mechanism, so as to generate the second frequency band. The first radiation element 610 and the fourth radiation element 640 can be excited together to generate the third frequency band. The first floating metal element 660 can be excited by the third radiation element 630 using a coupling mechanism, so as to generate the fourth frequency band. The second floating metal element 670 is configured to disturb the current distribution between the third radiation element 630 and the fifth radiation element 650, thereby fine-tuning the impedance matching of the second frequency band. In addition, the tuning circuit 680 can use its itself switching operation to increase the operational bandwidths of the first frequency band, the second frequency band, the third frequency band, and the fourth frequency band.

In some embodiments, the element sizes of the antenna structure 600 will be described as follows. The length L3 of the first floating metal element 660 may be shorter than or equal to 0.25 wavelength ($\lambda/4$) of the fourth frequency band of the antenna structure 600. The length L4 of the second floating metal element 670 may be shorter than or equal to 0.25 wavelength ($\lambda/4$) of the second frequency band of the antenna structure 600. The width of the first coupling gap GC5 may be shorter than or equal to 2.5 mm. The width of the second coupling gap GC6 may be shorter than or equal to 2.5 mm. The width of the third coupling gap GC7 may be shorter than or equal to 2.5 mm. The width of the fourth coupling gap GC8 may be shorter than or equal to 2.5 mm. The above ranges of element sizes are calculated and obtained according to many experimental results, and they help to optimize the operational bandwidth and impedance matching of the antenna structure 600.

The invention proposes a novel antenna structure including at least two floating metal elements for antenna adjustments. In comparison to the conventional design, the invention has at least the advantages of small size, wide bandwidth, and lower manufacturing cost. Therefore, the invention is suitable for application in a variety of mobile communication devices.

Note that the above element sizes, element shapes, and frequency ranges are not limitations of the invention. An antenna designer can fine-tune these settings or values in order to meet specific requirements. It should be understood that the antenna structure of the invention is not limited to the configurations depicted in FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
- a first radiation element, having a feeding point;
- a second radiation element, coupled to the feeding point;
- a third radiation element;
- a tuning circuit, wherein the third radiation element is coupled through the tuning circuit to a ground voltage;
- a first floating metal element, disposed between the second radiation element and the third radiation element;
- a second floating metal element, disposed between the first radiation element and the third radiation element; and
- a nonconductive support element, wherein the first radiation element, the second radiation element, the third radiation element, and the tuning circuit are disposed on the nonconductive support element.

2. The antenna structure as claimed in claim 1, wherein the first floating metal element substantially has a straight-line shape.

3. The antenna structure as claimed in claim 1, wherein the second floating metal element comprises a plurality of metal segments.

4. The antenna structure as claimed in claim 1, wherein the second floating metal element comprises a single metal segment.

5. The antenna structure as claimed in claim 1, wherein a first coupling gap is formed between the first floating metal element and the second radiation element, wherein a second coupling gap is formed between the first floating metal element and the third radiation element, wherein a third coupling gap is formed between the second floating metal element and the first radiation element, wherein a fourth coupling gap is formed between the second floating metal element and the third radiation element, and wherein a width of each of the first coupling gap, the second coupling gap, the third coupling gap, and the fourth coupling gap is shorter than or equal to 2.5 mm.

6. The antenna structure as claimed in claim 1, wherein the nonconductive support element has a first surface and a second surface opposite to each other, wherein the first radiation element and the second radiation element are disposed on the first surface of the nonconductive support element, and wherein the tuning circuit is disposed on the second surface of the nonconductive support element.

7. The antenna structure as claimed in claim 6, wherein the nonconductive support element further has a side surface, and wherein the third radiation element is disposed on the first surface or the side surface of the nonconductive support element.

8. The antenna structure as claimed in claim 1, wherein the antenna structure covers a first frequency band, a second frequency band, a third frequency band, and a fourth frequency band, wherein the first frequency band is from 617 MHz to 824 MHz, wherein the second frequency band is from 824 MHz to 960 MHz, wherein the third frequency band is from 1452 MHz to 1610 MHz, and wherein the fourth frequency band is from 1700 MHz to 2690 MHz.

9. The antenna structure as claimed in claim 8, wherein a length of the first floating metal element is shorter than or equal to 0.5 wavelength of the third frequency band.

10. The antenna structure as claimed in claim 8, wherein a length of the second floating metal element is shorter than or equal to 0.5 wavelength of the fourth frequency band.

11. The antenna structure as claimed in claim 1, wherein the tuning circuit comprises:
- a short-circuited element, coupled to the ground voltage;
- a capacitive element, coupled to the ground voltage;
- an inductive element, coupled to the ground voltage; and
- a switch element, wherein a terminal of the switch element is coupled to a connection point on the third radiation element, and wherein another terminal of the switch element is switchable between the short-circuited element, the capacitive element, and the inductive element.

12. An antenna structure, comprising:
- a first radiation element, having a feeding point;
- a second radiation element, wherein the first radiation element is coupled through the second radiation element to a ground voltage;
- a third radiation element, coupled to the first radiation element;
- a fourth radiation element, coupled to the first radiation element, wherein the third radiation element and the fourth radiation element substantially extend in opposite directions;
- a fifth radiation element;
- a tuning circuit, wherein the fifth radiation element is coupled through the tuning circuit to the ground voltage;
- a first floating metal element, disposed between the second radiation element and the third radiation element;
- a second floating metal element, disposed between the third radiation element and the fifth radiation element; and
- a nonconductive support element, wherein the first radiation element, the second radiation element, the third radiation element, the fourth radiation element, the fifth radiation element, and the tuning circuit are disposed on the nonconductive support element.

13. The antenna structure as claimed in claim 12, wherein the first floating metal element substantially has a straight-line shape.

14. The antenna structure as claimed in claim 12, wherein the second floating metal element comprises a plurality of metal segments.

15. The antenna structure as claimed in claim 12, wherein the second floating metal element comprises a single metal segment.

16. The antenna structure as claimed in claim 12, wherein a first coupling gap is formed between the first floating metal element and the second radiation element, wherein a second coupling gap is formed between the first floating metal element and the third radiation element, wherein a third coupling gap is formed between the second floating metal element and the third radiation element, wherein a fourth coupling gap is formed between the second floating metal element and the fifth radiation element, and wherein a width of each of the first coupling gap, the second coupling gap, the third coupling gap, and the fourth coupling gap is shorter than or equal to 2.5 mm.

17. The antenna structure as claimed in claim 12, wherein the antenna structure covers a first frequency band, a second frequency band, a third frequency band, and a fourth frequency band, wherein the first frequency band is from 617 MHz to 960 MHz, wherein the second frequency band is from 1400 MHz to 2000 MHz, wherein the third frequency band is from 2000 MHz to 2690 MHz, and wherein the fourth frequency band is from 3000 MHz to 6000 MHz.

18. The antenna structure as claimed in claim 17, wherein a length of the first floating metal element is shorter than or equal to 0.25 wavelength of the fourth frequency band.

19. The antenna structure as claimed in claim 17, wherein a length of the second floating metal element is shorter than or equal to 0.25 wavelength of the second frequency band.

20. The antenna structure as claimed in claim 12, wherein the tuning circuit comprises:

a short-circuited element, coupled to the ground voltage;

a capacitive element, coupled to the ground voltage;

an inductive element, coupled to the ground voltage; and a switch element, wherein a terminal of the switch element is coupled to a connection point on the fifth radiation element, and wherein another terminal of the switch element is switchable between the short-circuited element, the capacitive element, and the inductive element.

* * * * *